(12) United States Patent
Bohn et al.

(10) Patent No.: US 6,346,699 B1
(45) Date of Patent: Feb. 12, 2002

(54) OPTICAL ASSEMBLY HAVING A REDUCED WIDTH

(75) Inventors: David D. Bohn, Fort Collins; David S. Oliver, Milliken; Philip E. Jensen, Bellvue, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/477,541

(22) Filed: Jan. 4, 2000

(51) Int. Cl.[7] ............................................... H01J 40/14
(52) U.S. Cl. ................................ 250/214 R; 250/208.1
(58) Field of Search .......................... 250/214 R, 208.1, 250/214.1; 235/462.01, 462.45, 462.47, 472.01; 358/473; 382/313

(56) References Cited

U.S. PATENT DOCUMENTS

| | | | |
|---|---|---|---|
| 4,792,671 A | * 12/1988 | Masaki et al. | 250/214 R |
| 5,552,597 A | 9/1996 | McConica | 250/234 |
| 5,578,813 A | 11/1996 | Allen et al. | 250/208.1 |
| 5,644,139 A | 7/1997 | Allen et al. | 250/557 |
| 5,646,394 A | 7/1997 | Steinle et al. | 250/208.1 |
| 5,646,402 A | 7/1997 | Khovaylo et al. | 250/234 |

\* cited by examiner

*Primary Examiner*—Que T. Le

(57) ABSTRACT

An electronic device and method of manufacturing the electronic device are disclosed herein. The electronic device comprises a substrate with at least a first and a second linear optical component mounted thereto. Each of the linear optical components includes a photodetecting portion and an interface portion, wherein the photodetecting portions are electrically connected to the interface portions. The photodetecting portions of the linear optical components are aligned along a first axis. The interface portion of the at least one first linear optical component is offset from the first axis in a first direction. The interface portion of the at least one second linear optical component is offset from the first axis in a second direction, which is different from the first direction. This arrangement of optical components reduces the size of the electronic device, which in turn, reduces the size of any device that incorporates the electronic device.

32 Claims, 4 Drawing Sheets

OPTICAL ASSEMBLY HAVING A REDUCED WIDTH

FIELD OF THE INVENTION

The present invention relates to linear optical assemblies and, more particularly, to a linear optical assembly having a reduced size.

BACKGROUND OF THE INVENTION

Linear optical assemblies are devices that convert narrow scan line portions of an image of an object to machine-readable image data, sometimes referred to herein simply as image data. Image data representing a larger portion of the object is generated by moving the linear optical assembly relative to the object as the linear optical assembly generates image data representative of successive scan line portions of the image of the object. The image data of the object is, accordingly, represented by a plurality of scan lines in a similar manner as a video display represents an image of an object. The process of generating image data representative of an image of an object is often referred to as imaging or scanning the object.

Linear optical assemblies are used in a wide variety of devices, such as optical scanning devices and facsimile machines. These devices are typically used to generate an image of printed material, such as text printed on a sheet of paper. The linear optical device or a peripheral processor is then able to replicate the image by processing the image data in a conventional manner. For example, a facsimile machine generates image data representative of text printed on a sheet of paper and transmits the image data via a telephone line to another facsimile machine that replicates the image of the text onto another sheet of paper. In another example, an optical scanning device generates image data representative of an object, such as text printed on a sheet of paper, and stores the image data for processing. The image data may, as an example, be used to alter the image of the object or to transfer an image of the object by electronic means, e.g., e-mail.

A linear optical assembly typically comprises a light-emitting device and a photodetecting device in addition to a plurality of various electronic components. The light-emitting device illuminates the object being imaged and the photodetecting device images the object. The electronic components serve to support the light-emitting device and the photodetecting device. The light-emitting device may, as an example, be a linear light source, such as a linear array of light-emitting diodes, sometimes referred to herein simply as LEDs. The photodetecting device typically consists of a linear array of photodetecting elements, sometimes referred to herein simply as photodetectors. The photodetectors are typically grouped in individual photodetector segments wherein each photodetector segment has a small linear array of photodetectors. The individual photodetector segments have a photodetecting portion and an interface portion, wherein the photodetecting portion has the linear array of photodetectors and the interface portion has a connector or the like to transmit data from the photodetectors. Accordingly, the photodetecting portion generates image data and the interface portion transmits the image data from the photodetector segment.

Some linear optical assemblies have the addition of two-dimensional photodetector arrays, sometimes referred to herein simply as navigators, that serve to determine the location of the linear optical assembly relative to the object being imaged as image data is being generated. In addition to the navigators, LEDs, and photodetecting device, the linear optical assembly may include several other electronic components that are required to operate the linear optical assembly. For example, electronic components are required to regulate voltages and to accommodate the flow of image data from the photodetectors.

In order to provide for ease of manufacture and reduced costs, the above-described components comprising the linear optical assembly are typically located on a single printed circuit board. The photodetector segments are arranged so they face the object being imaged. Additionally, the photodetector segments must be arranged so that the photodetecting portions are adjacent one another to form a continuous linear array of photodetectors. Likewise, the LEDs are positioned on the printed circuit board so as to illuminate the portion of the object being imaged by the photodetector segments.

It is generally desirable to reduce the sizes of the devices that use linear optical assemblies. For example, in the case of a facsimile machine, a smaller facsimile machine occupies less desk space, which is inherently beneficial. In the case of optical scanning devices, the use of small optical assemblies allows the optical scanning device to be portable.

Locating the components comprising the linear optical assembly on a single printed circuit board, however, tends to increase the size of the linear optical device. This is important due to the fact that the components comprising the linear optical device must be placed on the single printed circuit board so that they will not interfere with each other either optically or electrically. Furthermore, the photodetector segments must be linearly arranged and adjacent to each other. In the case of the LEDs, light emitted by the LEDs cannot intersect the navigators until the light has reflected from the object, otherwise the light will interfere with the light reflected from the object. Thus, the size of a linear optical assembly is generally limited by the physical and optical characteristics of the components comprising the linear optical assembly.

Accordingly, a need exists for a linear optical assembly having a reduced size wherein the components comprising the linear optical assembly are mounted to a single printed circuit board.

SUMMARY OF THE INVENTION

An optical assembly having a reduced size is disclosed herein. The optical assembly may comprise a printed circuit board having a plurality of electronic and optoelectronic components attached thereto. The optoelectronic components may include a linear arrangement of linear photosensor segments and at least one two-dimensional photosensing device. The electronic components may include a linear array of light-emitting diodes (LEDs) and other components necessary for the operation of the optoelectronic components. The components comprising the optical assembly may be electronically connected to a processor.

Each linear photosensor segment may have an interface portion and a photodetecting portion. The photodetecting portions may comprise linear arrays of photodetectors that convert portions of a scan line of an image of an object to image data. The interface portions may connect the photodetecting portions to the printed circuit board.

The photosensor segments may be arranged on the printed circuit board so that the photodetectors are linearly aligned along an axis. The interface portions of the individual photosensor segments may face either a first direction or a second opposite direction. By orienting the interface portions in different directions, the photosensor segment may be arranged so as to best utilize the area of the printed circuit board. This in turn, allows for the optical assembly to have a reduced size. For example, the interface portions may be arranged so that they have spaces located therebetween. Other components comprising the optical assembly may be located in these spaces. Locating components in these spaces allows a high concentration of components to be located in the vicinity of the optical sensors rather than on other areas of the printed circuit board. This in turn, serves to reduce the area of the printed circuit board and, thus, the optical assembly.

DETAILED DESCRIPTION OF THE INVENTION

Figure 1:
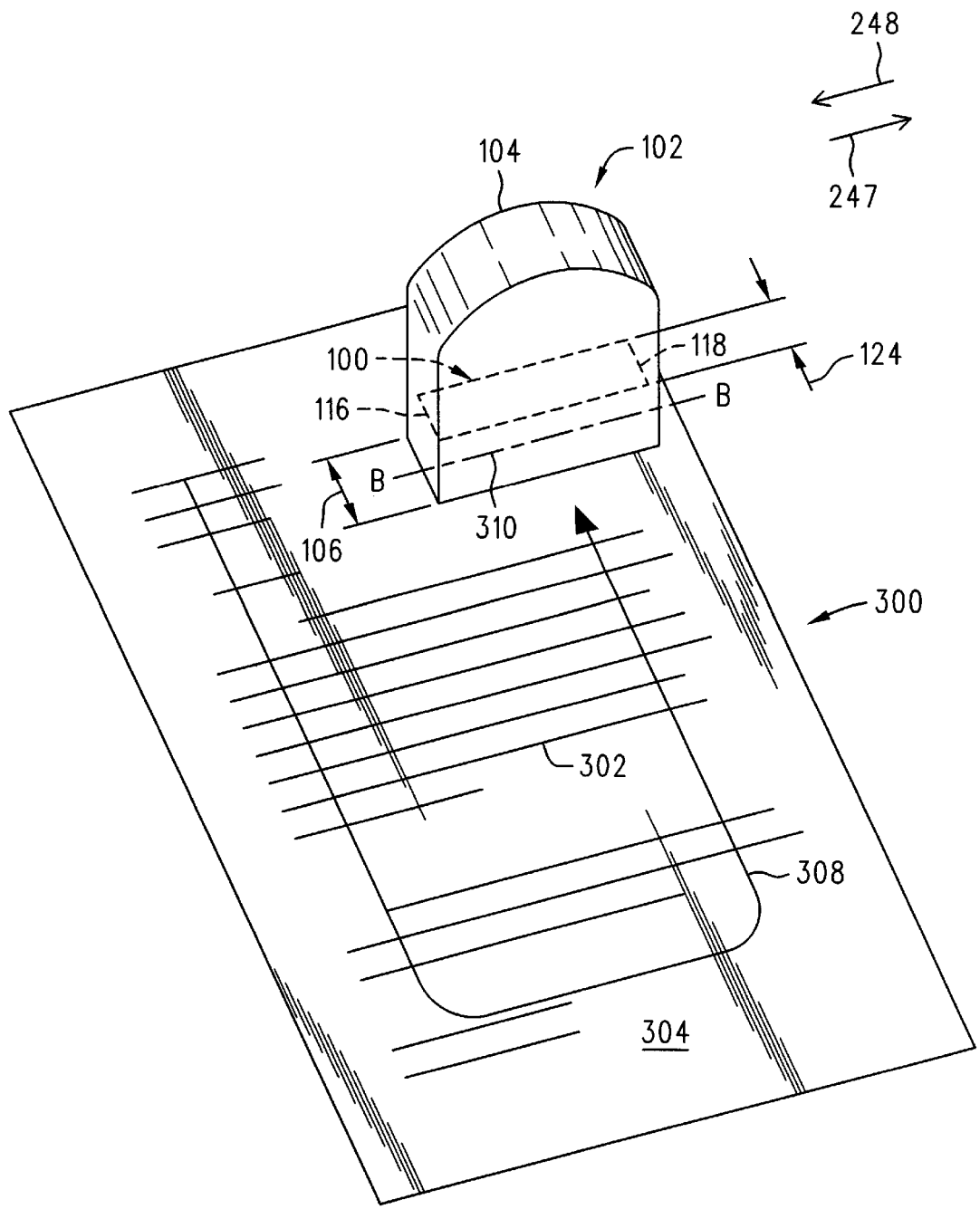
FIG. 1 is a front perspective view of an optical scanning device comprising an optical assembly having a reduced area.

FIGS. 1 through 4, in general, illustrate a method of manufacturing an electronic device 100 comprising: providing a substrate 110; providing a plurality of optical components 180, each including a photodetecting portion 200 and an interface portion 202 electrically connected to the photodetecting portion 200; mounting a first 185 of the plurality of optical components 180 to the substrate 110 with the photodetecting portion 205 thereof aligned along a first axis and the interface portion 225 thereof offset from the first axis in a first direction 246; mounting a second 186 of the plurality of optical components 180 to the substrate 110 with the photodetecting portion 206 thereof aligned along the first axis and the interface portion 226 thereof offset from the first axis in a second direction 244 which is different from the first direction 246.

FIGS. 1 through 4 also, in general, illustrate an electronic device 100 comprising: a substrate 110; at least one first linear optical component 185 mounted to the substrate 110; at least one second linear optical component 186 mounted to the substrate 110; wherein each of the at least one first and at least one second optical components 185, 186 includes: a photodetecting portion 205, 206; and an interface portion 225, 226 electrically connected to the photodetecting portion 205, 206; wherein the photodetecting portion 205 of the at least one first linear optical component 185 is aligned along a first axis; wherein the photodetecting portion 206 of the at least one second linear optical component 186 is aligned along the first axis; wherein the interface portion 225 of the at least one first linear optical component 185 is offset from the first axis in first direction 246; and wherein the interface portion 226 of the at least one second linear optical component 186 is offset from the first axis in a second direction 244 which is different from the first direction 246.

FIGS. 1 through 4 also, in general, illustrate an electronic device 100 comprising: a substrate 110; a plurality of linear optical components 180 mounted to the substrate 110, each of the plurality of linear optical components 180 includes a photodetecting portion 200 an interface portion 202 electrically connected to the photodetecting portion 200; wherein the photodetecting portion 200 of each of said plurality of linear optical components 810 is aligned along a first axis AA; the interface portions 225, 228 of at least a first 185 and a second 188 of the plurality of linear optical components 180 being offset from the first axis in a first direction 246 and defining a first space therebetween; the interface portions 227, 236 of at least a third 187 and a fourth 196 of the plurality of linear optical components 180 being offset from the first axis in a second direction 244 and defining a second space therebetween; wherein the first direction 246 is different from the second direction 244.

Having generally described the optical assembly 100, it will now be described in greater detail. A brief summary of conventional optical assemblies is followed by a summary and more detailed description of the optical assembly 100. The optical assembly 100 described herein is of the type used in conjunction with a hand-held optical scanning device 102, FIG. 1. It is to be understood, however, that the use of the optical assembly 100 used in conjunction with the scanning device 102 is for illustration purposes only and that the optical assembly 100 may be used in conjunction with other devices. For example, the optical assembly 100 may be used in conjunction with a facsimile machine.

Optical assemblies, including the optical assembly 100, in summary, convert a narrow scan line portion of the image of an object to machine-readable image data (sometimes referred to herein simply as image data). The object is described herein as being the surface 304 of a sheet of paper 300, including text 302 printed on the surface 304. It is to be understood, however, that the use of the sheet of paper 300 is for illustration purposes only and that the optical assembly 100 may convert images of other objects to image data.

The above-described scan line portion 310 extends along the reference line BB on the surface 304 of the sheet of paper 300. In order to generate image data representative of the whole sheet of paper 300, the optical assembly 100 is moved relative to the surface 304 of the sheet of paper 300 as the optical assembly 100 generates image data of successive scan line portions 310 of the surface 304. Thus, the image data representative of the surface 304 is in the form of successive scan line portions 310.

Figure 2:
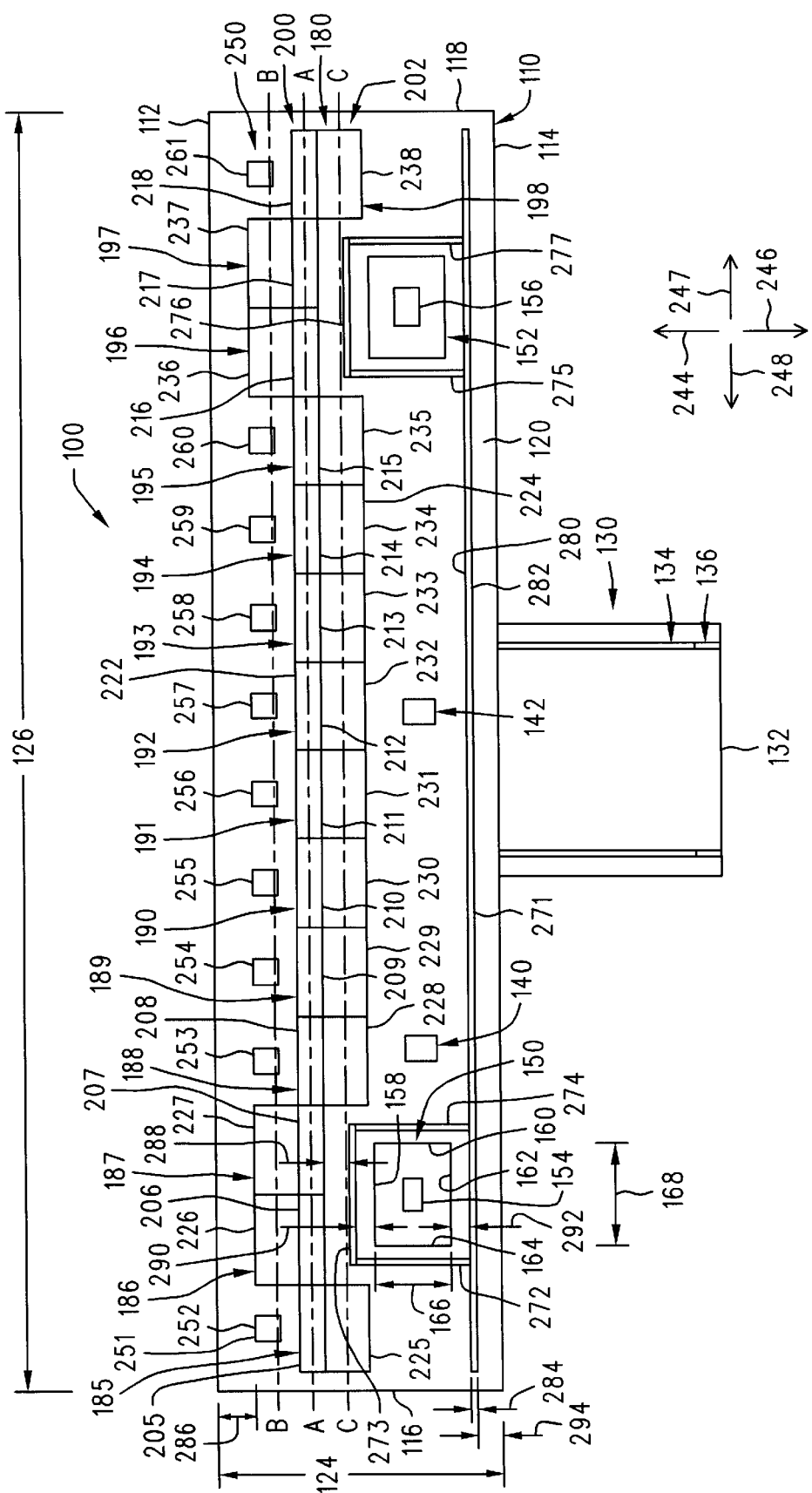
FIG. 2 is a top view of the optical assembly of FIG. 1.
Figure 3:
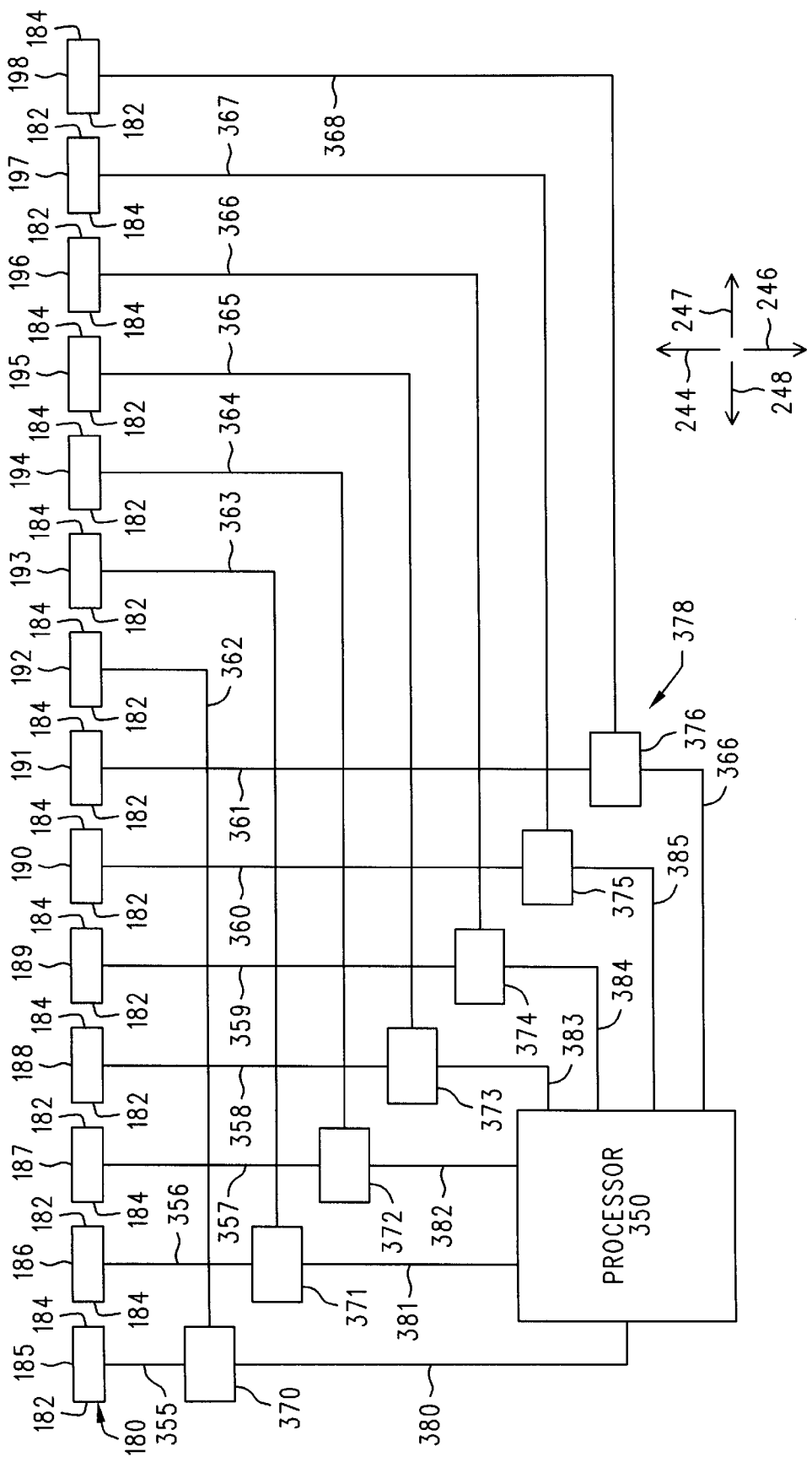
FIG. 3 is a schematic illustration of the optical assembly of FIG. 1.
Figure 4:
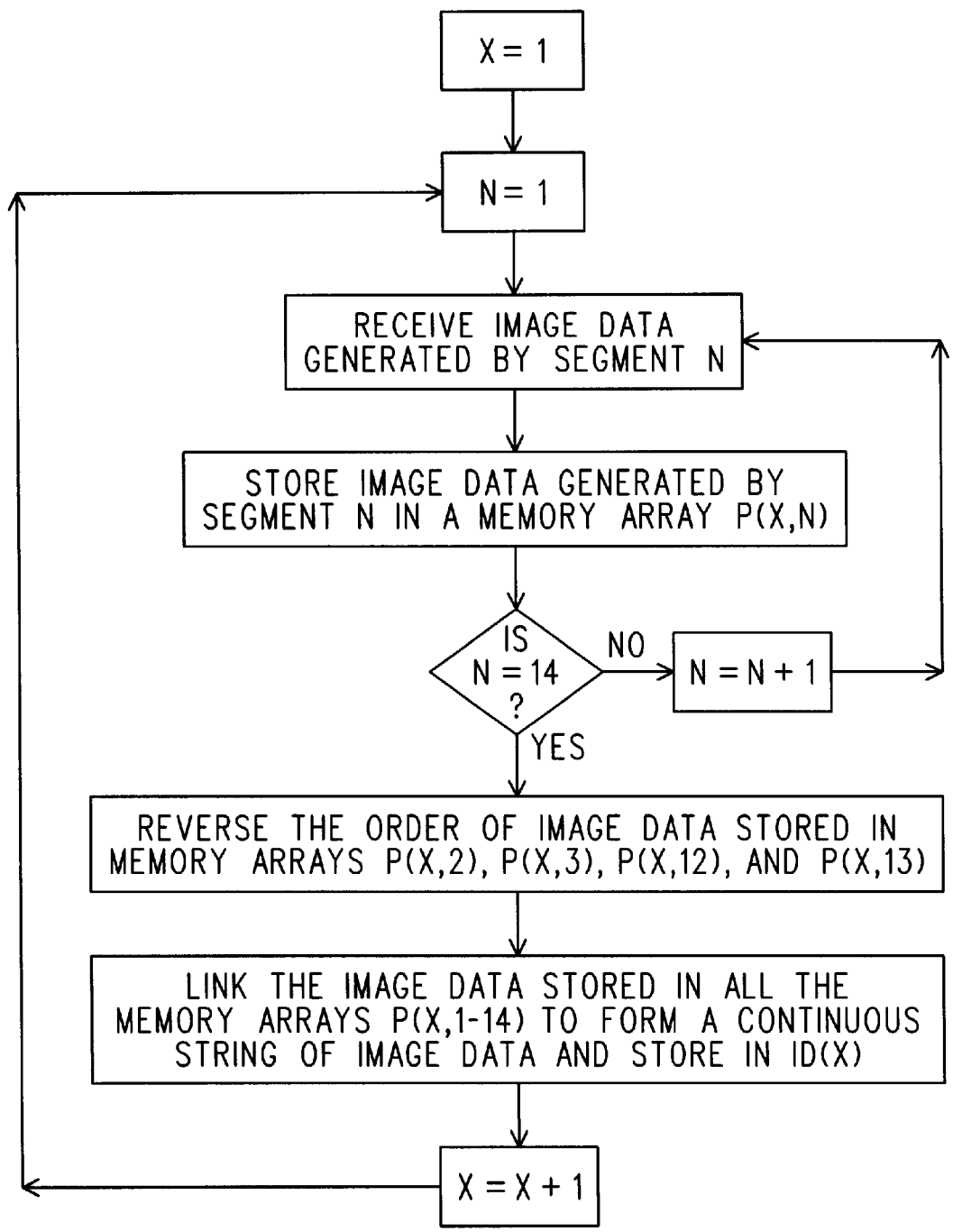
FIG. 4 is a flow chart illustrating a method of processing image data generated by the optical assembly of FIG. 2.

Referring to FIG. 2, a plurality of linearly arranged photosensor segments 180 may be mounted to the printed circuit board 110 and may serve to image the scan line portion 310, FIG. 1, of the surface 304. Each photosensor segment 180 may have a photodetecting portion 200 and an interface portion 202. Each photodetecting portion 200 may comprise a linear array of photodetectors, not shown, that convert light to image data, wherein the light is representative of the image of the scan line portion 310, FIG. 1. The interface portions 202 may be connectors or the like that output the image data in a serial format and may serve to electrically connect the photodetecting portions 200 to the printed circuit board 110. Referring to FIG. 3, each photosensor segment 180 may have a first side 182 and a second side 184. The serial output of image data may commence with image data generated by the photodetector located nearest the first side 182 and may terminate with image data generated by the photodetector located nearest the second side 184.

In a conventional optical assembly, the photosensor segments 180 are arranged so that all the first sides 182 face the same direction. For example, all the first sides 182 may face a negative x-direction 248. With reference to FIG. 2, in a conventional optical assembly, all of the interface portions 202 face the same direction. For example, the interface portions 202 may all face a positive y-direction 244. This arrangement of photosensor segments 180 in a conventional optical assembly allows for simplified image data processing because the image data output by the photosensor segments 180 can be electronically attached to each other to generate image data that accurately represents the image of the scan line portion 310, FIG. 1. This arrangement of photosensor segments 180, however, has drawbacks in that the photosensor segments 180 cannot be arranged to accommodate other components that may comprise the conventional optical assembly. This, in turn, results in a conventional optical assembly occupying a relatively large area.

The optical assembly 100 disclosed herein has a reduced width 124 and, thus, a reduced area, which is achieved by arranging the photosensor segments 180 so as to accommodate other components comprising the optical assembly 100. For example, some interface portions 202 face the positive y-direction 244 and the remaining interface portions 202 face a negative y-direction 246. For example, interface number two 226, interface number three 227, interface number twelve 236, and interface number thirteen 237 may face the positive y-direction 244 and may be arranged along a reference axis BB. Likewise, interface number one 225, interface numbers four through eleven (228–235), and interface number fourteen 238 may face the negative y-direction 246 and may be arranged along a reference axis CC. The photodetecting portions 200, however, remain linearly arranged along a reference axis AA. The optical assembly 100 illustrated in FIG. 2 has four photosensor segments 180 that face the positive y-direction 244 to accommodate a first navigator portion 150 and a second navigator portion 152. Arranging the photosensor segments 180 to accommodate the other components comprising the optical assembly 100 allows the components to be more compact, which in turn, reduces the size of the optical assembly 100.

The order of image data output by the photosensor segments 180 facing the positive y-direction 244 is in a reverse order relative to the image data output by the remaining photosensor segments 180. In order to overcome this problem, a processor, not shown in FIG. 2, electronically reverses the order of the image data generated by the photosensor segments 180 facing the positive y-direction 244 relative to the image data generated by the remaining photosensor segments 180 facing the negative y-direction 246. This reversal of image data allows the image data generated by all of the photosensor segments 180 to be strung together to form image data that accurately represents the image of the scan line portion 310, FIG. 1.

Having summarily described the optical assembly 100, it will now be described in greater detail.

Referring to FIG. 1, the optical assembly 100 described herein may be of the type used in a portable hand-held scanning device 102. The scanning device 102 is illustrated in FIG. 1 generating image data representative of text 302 printed on a surface 304 of a sheet of paper 300. The process of generating image data representative of an image of an object is sometimes referred to as scanning or imaging the object. The scanning device 102 images the surface 304, including the text 302, by imaging successive narrow scan line portions 310 of the surface 304 as the scanning device 102 is moved along a path 308 relative to the surface 304.

The components comprising the scanning device 102, including the optical assembly 100, may be located within a housing 104. The housing 104 may have a width 106, which may be small relative to conventional scanning devices. This small width 106 improves the portability of the scanning device 102. For example, a smaller width 106 allows the scanning device 102 to readily fit into a user's hand. The smaller width 106 also makes the scanning device 102 easier to transport. For example, the scanning device 102 may be made small enough to fit into a user's pocket. The housing 104 may, as an example, be an injection molded unit made from polycarbonate with 30% glass fibers.

For reference purposes, the optical assembly 100 and, thus, the housing 104, may have a left side 116 and a right side 118. The left side 116 may face a negative x-direction 248 and the right side 118 may face a positive x-direction 247, wherein the positive x-direction 247 and the negative x-direction 248 are opposite each other. The scan line portion 310 may be positioned along a reference line BB that is parallel to the positive x-direction 247 and the negative x-direction 248. It should be noted that the scan line portion 310 is generated by the optical assembly 100. Thus, its location relative to the surface 304 is fixed by the location of the scanning device 102 relative to the surface 304.

Referring to FIG. 2, the optical assembly 100 may have a conventional printed circuit board 110 (sometimes referred to herein as a substrate) to which a plurality of components are electrically and mechanically attached. The printed circuit board 110 may have an upper side 112, a lower side 114, the left side 116, and the right side 118. The sides may define the boundaries of a surface 120. A width 124 may extend between the upper side 112 and the lower side 114. The width 124 may, as an example, be approximately 9.75 millimeters. A length 126 may extend between the left side 116 and the right side 118. The length 126 may, as an example, be approximately 123 millimeters. It should be noted that the dimensions of the optical assembly 100 illustrated in FIG. 2 have been greatly enlarged for illustration purposes. As will be described below, an objective of the optical assembly 100 is to minimize the width 124, which in turn, allows the width 106, FIG. 1, of the scanning device 102 to be minimized.

The printed circuit board 110 may have a plurality of lands, not shown, that serve to conduct electric current between various locations and components on the printed circuit board 110. A connector 130 may extend from the lower side 114 of the printed circuit board 110 and may be electrically connected to the lands. Additionally, the connector 130 may be mechanically connected to the printed circuit board 110 in the proximity of the lower side 114. The connector 130 may have an end 132 located opposite the lower side 114 of the printed circuit board 110. A plurality of lands 134 may be located in the connector 130 and may extend between the lands, not shown, in the printed circuit board 110 and the end 132. Each land 134 may terminate at a conductor 136 located adjacent the end 132. The conductors 136 may serve as electrical contact points for the lands 134. The connector 130 may serve to provide power to the optical assembly 100 as well as to transfer data between the optical assembly 100 and peripheral devices, not shown in FIG. 2. The connector 130 may, as an example, be a conventional ribbon cable.

A plurality of electronic components may be mounted to the surface 120 of the printed circuit board 110. For illustration purposes, only a first electronic component 140 and a second electronic component 142 are illustrated as being mounted to the surface 120 of the printed circuit board 110. It is to be understood, however, that there are typically more than two electronic components mounted to the surface 120 of the printed circuit board 110. The electronic components 140, 142 may, as examples, be surface mount capacitors, resistors, or integrated circuits that are necessary for the operation of the optical assembly 100.

The surface 120 of the printed circuit board 110 may have a first navigator portion 150 and a second navigator portion 152. The navigator portions 150, 152 may be conventional ground planes that serve as shielding and mounting areas for a first navigator 154 and a second navigator 156 respectively. The navigators 154, 156 may comprise two-dimensional photodetector arrays that ultimately serve to determine the position of the scanning device 102, FIG. 1, relative to the surface 304 of the sheet of paper 300. The first navigator 154 and the second navigator 156 may significantly occupy the first navigator portion 150 and the second navigator portion 152. For illustration purposes, the first navigator 154 and second navigator 156 are illustrated as only occupying small regions of the first navigator portion 150 and the second navigator portion 152.

The first navigator portion 150 may have a top side 158, a right side 160, a bottom side 162, and a left side 164 and may be substantially rectangular shaped. A height 166 may extend between the top side 158 and the bottom side 162. The height 166 may, as an example, be approximately 6.0 millimeters. A width 168 may extend between the left side 164 and the right side 160. The width 168 may, as an example, be approximately 8.0 millimeters. The second navigator portion 152 may have the same shape and dimensions as the first navigator portion 150. The locations of the navigator portions 150, 152 relative to the printed circuit board 110 will be described below. Areas of the surface 120 in the proximity of the first navigator portion 150 and the second navigator portion 152 may be adapted to connect wires from the first navigator 154 and the second navigator 156 to the lands in the printed circuit board 110.

A plurality of linear optical sensor arrays 180 (sometimes simply referred to herein simply as photosensor segments) may be mechanically and electrically attached to the surface 120 of the printed circuit board 110. The photosensor segments 180 may, as an example, be of the type commercially available from Texas Advanced Optoelectronics Solutions, Inc. of Plano, Tex. as model number TSL2301. The optical assembly 100 is illustrated in FIG. 2 as having 14 photosensor segments 180 attached to the printed circuit board 110. It is to be understood that the optical assembly 100 may have more or less photosensor segments 180 depending on the application of the optical assembly 100. The individual photosensor segments 180 are referred to herein as segment numbers one through fourteen and depicted numerically as 185 through 198 respectively.

The photosensor segments 180 may have photodetecting portions 200 and interface portions 202. Accordingly, each individual segment 185–198 may have a photodetecting portion, which are referred to herein as photodetecting portion numbers one through fourteen and referenced numerically as 205 through 218 respectively. Each photodetecting portion 205–218 may have a linear arrangement of pixels, not shown, mounted thereto, wherein there may be approximately 102 pixels mounted to each photodetecting portion 205–218. The pixels are sometimes referred to herein as photodetectors. In addition to the photodetecting portions 205–208, each segment 185–198 may have an interface portion referred to as interface numbers one through fourteen and referenced numerically as 225–238 respectively. The photodetecting portions 200 and the interface portions 202 may be electrically connected to each other. Each photosensor segments 180 may have a photodetecting side 222 and an interface side 224 as illustrated by segment number eight 192 and segment number ten 194. The distance between the photodetecting side 222 and the interface side 224 may, as an example, be approximately 1.0 millimeters.

The photodetecting portions 200 of the photosensor segments 180 may be linearly arranged along the reference line AA. More specifically, the pixels on the photodetecting portions 200 may be linearly arranged along the reference line AA. As described above, the pixels are photodetecting elements that convert light to image data. Accordingly, the reference line AA corresponds to the above-described scan line portion 310, FIG. 1, of the surface 304 of the sheet of paper 300 that is converted to image data.

The interface portions 202 may serve to electrically connect the photodetecting portions 200 to the lands, not shown, in the printed circuit board 110. The interface portions 202 may, as an example, comprise wires, not shown, encapsulated in epoxy. In addition, the interface portions 202 may have electronics necessary for the transmission of image data. For example, analog to digital converters may be located in the interface portions 202. The interface portions 202 may serve to provide power to the pixels and to transfer image data from the pixels to the printed circuit board 110. The interface portions 202 may also serve to transmit instructions from a peripheral device, e.g., a processor, to the photosensor segments 180.

The interface portions 202 may face either a positive y-direction 244 or a negative y-direction 246 wherein the positive y-direction 244 is an opposite direction relative to the negative y-direction 246. To further illustrate the positive y-direction 244 and the negative y-direction 246, interface number one 225 is illustrated facing the negative y-direction 246 and interface number two 226 is illustrated facing the positive y-direction 244. Regardless of the direction the interface portions 202 face, the pixels on the photodetecting portions 200 remain linearly arranged along the reference line AA.

In addition to the positive y-direction 244 and the negative y-direction 246, the positive x-direction 247 and the negative x-direction 248 may be used to describe directions and orientations of components located on the printed circuit board 110. The positive x-direction 247 and negative x-direction 248 may be opposite each other and may be perpendicular to the positive y-direction 244 and negative y-direction 246. As will be described below, the positive x-direction 247 and negative x-direction 248 may be used to describe the output of image data generated by the photosensor segments 180.

A plurality of LEDs 250 may be electrically and mechanically connected to the surface 120 of the printed circuit board 110. In the optical assembly 100 illustrated in FIG. 2, there are ten LEDs 250 referred to as the first through the tenth LED and referenced numerically as 252 through 261 respectively. The LEDs 250 may have a side 251, as illustrated on the first LED 252, that faces the upper side 112 of the printed circuit board 110. The LEDs 250 may serve to illuminate the scan line portion 310, FIG. 1, of the surface 304 of the sheet of paper 300 that is being imaged. It is to be understood that the LEDs 250 are for illustration purposes only and that other conventional illumination devices may substitute the LEDs 250.

A plurality of light baffles may be attached to the surface 120 of the printed circuit board 110 and may serve to keep extraneous light from interfering with the optical components located on the printed circuit board 110. A first baffle 271 may be located proximate the lower side 114 of the printed circuit board 110 and may extend between the proximity of the left side 116 and the proximity of the right side 118. A second baffle 272, a third baffle 273, and a fourth baffle 274 may encompass the first navigator portion 150 and may serve to reduce extraneous light that may interfere with the first navigator 154. A fifth baffle 275, a sixth baffle 276, and a seventh baffle 277 may encompass the second navigator portion 152 and may serve to reduce extraneous light that may interfere with the second navigator 156. The baffles may have a baffle first side 280 and a baffle second side 282 separated by a baffle width 284. The baffle width 284 may, as an example, be approximately 0.25 millimeters. The baffles may, as an example, be made of a polycarbonate film material and may be attached to the surface 120 of the printed circuit board 110 by the use of an adhesive. Alternatively, the baffles may be attached to the housing 104, FIG. 1, so that they interact with the components located on the printed circuit board 110 when the printed circuit board 110 is placed into the housing 104.

Having described the components mounted to the surface 120 of the printed circuit board 110, their locations relative to each other and the printed circuit board 110 will now be described. The interface sides 224 of the photosensor segments 180 facing the positive y-direction 244 may be located a distance 286 from the upper side 112 of the printed circuit board 110. More specifically, the photosensor segments 180 facing the positive y-direction 244 are segment number two 186, segment number three 187, segment number twelve 196, and segment number thirteen 197. The LEDs 250 are typically smaller than the interface portions 202, thus, the sides 251 of the LEDs 250 are located further from the upper side 112 of the printed circuit board 110 than the distance 286. The photodetecting sides 222 of the photosensor segments 180 facing the positive y-direction 244 may be located a distance 288 from the baffle first side 280 of the third baffle 273 and the sixth baffle 276. The distance 288 may, as an example, be approximately 0.25 millimeters. A distance 290 may extend between the baffle second side 282 of the third baffle 273 and the top side 158 of the first navigator portion 150. The distance 290 may, as an example, be approximately 0.25 millimeters. A similar distance may exist with reference to the sixth baffle 276 and the second navigator portion 152. A distance 292 may extend between the bottom side 162 of the first navigator portion 150 and the baffle first side 280 of the first baffle 271. The distance 292 may, as an example, be approximately 0.25 millimeters. A similar distance may also exist with reference to the distance between the second navigator portion 152 and the first baffle 271. A distance 294 may extend between the baffle second side 282 of the first baffle 271 and the lower side 114 of the printed circuit board 110. The distance 294 may, as an example, be approximately 0.25 millimeters. Alternatively, the first baffle 271 may be located at the lower side 114, thus, eliminating the distance 294.

The width 124 of the printed circuit board 110 is, thus, equal to the sum of the following distances: the distance 286, the distance between the photodetecting side 222 and the interface side 224 of the photosensor segments 180, the distance 288, the baffle width 284 of the third baffle 273, the distance 290, the height 166 of the first navigator portion 150, the distance 292, and the baffle width 284 of the first baffle 271. With the above-described example measurements, the width 124 is equal to approximately 9.75 millimeters.

Conventional optical assemblies are not able to achieve the reduced width 124 as described herein with regard to the optical assembly 100. The reduced width 124 of the optical assembly 100 is achieved, in part, by the use of the baffles 271–278 and by the orientation of the photosensor segments 180. Conventional optical assemblies, including those used in conjunction with optical scanning devices, have light baffles that are integrally formed into the housing. The housings are typically made of plastic or a similar material, thus, these light baffles tend to be relatively thick and, accordingly, they tend to increase the width of the optical scanning device. The use of a material, such a polycarbonate film, significantly reduces the baffle widths 284 of the baffles 271–278 relative to conventional light baffles. The reduced baffle widths 284 are reflected in a reduced width 124 of the printed circuit board 110.

The orientation of the photosensor segments 180 provides for improved efficiency of the surface 120 of the printed circuit board 110. This improved efficiency is used to minimize the width 124 of the printed circuit board 110. For example, segment number two 186, segment number three 187, segment number twelve 196, and segment number thirteen 197 are oriented in the positive y-direction 244. The remaining photosensor segments 180 are oriented in the negative y-direction 246. This orientation of the photosensor segments 180 provides for the first navigator portion 150 and the second navigator portion 152 to be nested within the linear array of photosensor segments 180. This orientation further provides for the array of LEDs 250 to be present in all locations except for regions where the photosensor segments 180 are oriented in the positive y-direction 244. These regions have extended spacing between the LEDs 250. As will be described below, a non-imaging illumination concentrator may be associated with the optical assembly 100 to illuminate regions of the surface 304, FIG. 1, that correspond to the extended spacing between the aforementioned LEDs 250. The non-imaging illumination concentrator is sometimes referred to as a light guide or a light diffuser.

Having described the primary discrete components comprising the optical assembly 100, their association to each other will now be described. Referring to FIG. 3, which is a schematic illustration of the optical assembly 100, including a peripheral processor 350, the photosensor segments 180 may be electrically connected to the processor 350 via seven interface modules 378 and a plurality of data lines. The interface modules 378 are referred to individually as interface modules one through seven and referenced numerically as 370 through 376 respectively. The interface modules 378 may serve to group the image data generated by the photosensor segments 180 for easier transmission of the image data to the processor 350 as described below. The data lines are referred to as data line one through data line fourteen and referenced numerically as 355 through 368 respectively. Segment number one 185 and segment number eight 192 may be electrically connected to interface module one 370 via data line one 355 and data line eight 362 respectively. Segment number two 186 and segment number nine 193 may be electrically connected to interface module two 371 via data line two 356 and data line nine 363 respectively. Segment number three 187 and segment number ten 194 may be electrically connected to interface module three 372 via data line three 357 and data line ten 364 respectively. Segment number four 188 and segment number eleven 195 may be electrically connected to interface module four 373 via data line four 358 and data line eleven 365 respectively. Segment number five 189 and segment number twelve 196 may be electrically connected to interface module five 374 via data line five 359 and data line twelve 366 respectively. Segment number six 190 and segment number thirteen 197 may be electrically connected to interface module six 375 via data line six 360 and data line thirteen 367 respectively. Segment number seven 191 and segment number fourteen 198 may be electrically connected to interface module seven 376 via data line seven 361 and data line fourteen 368 respectively. The data lines 355–368 are electrically connected to the interface portions 202, FIG. 2, of the photosensor segments 180, however, for illustration purposes, they are illustrated as being generally connected to the photosensor segments 180.

Each interface module 370–376 may be electrically connected to the processor 350 via a plurality of interface lines. The interface lines are referenced herein as interface lines 380 through 386. The data lines 355–368 and the interface lines 380–386 may serve to transmit image data from the photosensor segments 180 to the processor 350 in a conventional manner. They may also serve to transmit instructions from the processor 350 to the interface modules 378 and the photosensor segments 180 in a conventional manner.

FIG. 3 further illustrates that each photosensor segment 180 may have a first side 182 and a second side 184. The photodetectors, not shown, may be lineally arranged on the photosensor segments 180 between the first sides 182 and the second sides 184. The image data output by each of the photosensor segments 180 may be in a serial binary format that may, as an example, start with image data generated by the photodetector nearest the first side 182 and that may terminate with image data generated by the photodetector nearest the second side 184. Segment number two 186, segment number three 187, segment number twelve 196, and segment number thirteen 197 are oriented with their first sides 182 facing the positive x-direction 247. The remaining photosensor segments 180 are oriented with their first sides 182 facing the negative x-direction 248. In a conventional optical assembly, all the first sides 182 face the same direction. As will be described below, image data output by segment number two 186, segment number three 187, segment number twelve 196, and segment number thirteen 197 will be in a reverse order relative to image data output by the remaining photosensor segments 180.

Having described the components comprising the optical assembly 100, its operation will now be described.

Referring to FIG. 1, the optical assembly 100 is described herein as being incorporated into the hand-held scanning device 102. The scanning device 102 is described as generating image data representative of the surface 304 of the sheet of paper 300. Generating image data representative of an image of an object is often referred to as imaging or scanning the object. Examples of using an optical scanning device to generate image data are described in the following patents, which are all hereby incorporated by reference for all that is disclosed therein: U.S. Pat. No. 5,552,597 of McConica for HAND-HELD SCANNER HAVING ADJUSTABLE LIGHT PATH; U.S. Pat. No. 5,646,394 of Steinle for IMAGING DEVICE WITH BEAM STEERING CAPABILITY; and U.S. Pat. No. 5,646,402 of Khovaylo et al. for EXPANDABLE HAND-HELD SCANNING DEVICE.

During the imaging process, the optical assembly 100 generates image data representative of a plurality of successive scan line portions 310 of the surface 304 of the sheet of paper 300. More specifically, the image data representative of the scan line portions 310 is generated as the scanning device 102 is moved relative to the surface 304 of the sheet of paper 300. For example, the scanning device 102 may be moved to follow the path 308 on the surface 304 of the sheet of paper 300. Accordingly, the image data is representative of a plurality of scan line portions 310 that may be skewed across the surface 304 of the sheet of paper 300. The processor 350, FIG. 3, uses conventional software to properly position the skewed scan line portions relative to each other so as to accurately replicate the image of the surface 304.

Referring to FIG. 2, the optical assembly 100 is located in the housing 104, FIG. 1 so that the surface 120 of the printed circuit board 110 faces the surface 304 of the sheet of paper 300. During the imaging process, the LEDs 250 emit light to illuminate the scan line portion 310 of the surface 304 of the sheet of paper 300. It should be noted that due to the orientation of the photosensor segments 180, a large space exists between the first LED 252 and the second LED 253. A similar large space exists between the ninth LED 260 and the tenth LED 261. It should also be noted that the arrangement of electrical components on the surface 120 of the printed circuit board 110 may require that other photosensor segments 180 be oriented with their interface portions 202 facing the positive y-direction 244. This will result in the loss of the corresponding LED, which in turn, leaves another space between the LEDs as described above.

The above-described spaces in the linear array of LEDs 250 results in nonuniform illumination of the surface 304, FIG. 1, of the sheet of paper 300. Accordingly, the scan line portion 310 that is to be imaged by the optical assembly 100 will not be uniformly illuminated. This, in turn, results in the image of the scan line portion corresponding to the above-described spaces in the linear array of LEDs 250 being darker in these areas. Accordingly, these areas of the scan line portion 310 will not reflect an accurate representation of the surface 304, FIG. 1. In order to overcome this problem associated with nonuniform illumination, the optical assembly 100 may be calibrated to account for the nonuniform illumination or provided with a light diffuser. Calibration involves imaging a uniform surface having a predetermined reflectivity. The processor 350, FIG. 3, analyses the image data and scales the outputs of each photodetector so that the output of each photodetector has a predetermined value. This predetermined value corresponds to the reflectivity of the uniform surface having a predetermined reflectivity. The scaling is then used when the image of the surface 304, FIG. 1, is replicated so as to account for the nonuniform illumination.

A light diffuser (sometimes referred to as a light guide) will cause the light emitted by the LEDs 250 to diffuse throughout the scan line portion 310 of the scan line portion 310, FIG. 1, that is being imaged. This diffused light results in a more uniform illumination of the surface 304, FIG. 1. It is to be understood that the light diffuser may be used with an optical assembly 100 that has been calibrated as described above to generate image data that more accurately represents the surface 304. The optical assembly 100, however, should be calibrated with the light diffuser associated therewith. An example of a light diffuser that may be used in the scanning device 102, FIG. 1, is disclosed in the U.S. patent application, Ser. No. 09/477,205 of Bohn et al. for CONTACT IMAGE SENSOR WITH LIGHT GUIDE, which is hereby incorporated by reference for all that is disclosed therein.

The image of the scan line portion 310, FIG. 1, of the surface 304 reflects from the surface 304 to the photodetecting portions 200 of the photosensor segments 180. The photodetectors, not shown, on the photodetecting portions 200 convert discrete regions of the scan line portion 310, FIG. 1, to image data. The image data is then output from the photodetecting portions 200 to the interface portions 202, FIG. 3. The interface portions 202 are electrically connected to lands, not shown, in the printed circuit board 110, which ultimately conduct the image data to the conductors 136 at the end 132 of the connector 130 via the lands 134. The image data may then be transmitted to a peripheral processor.

Having described the process of generating image data, processing the image data will now be described. The following description summarizes the processing of the image data. A more detailed description of the processing follows this summary. Referring to FIG. 3, as described above, the photosensor segments 180 generate image data representative of the scan line portion 310, FIG. 1, of the surface 304. Upon receipt of a command from the processor 350, the individual photosensor segments 180 output the image data to the processor 350 via the interface modules 378. The image data output by each photosensor segment 180 is a data stream in the form of serial binary data. The data stream commences with image data generated by the photodetector, not shown, located nearest the first side 182 of each photosensor segment 180 and terminates with image data generated by the photodetector, not shown, located nearest the second side 184. As will be described below, the processor 350 has to reverse the order of the image data generated by segment number two 186, segment number three 187, segment number twelve 196, and segment number thirteen 197 due to the reverse orientation of these photosensor segments relative to the other photosensor segments 180. The image data generated by all the photosensor segments 180 is then linked together to create image data representative of the scan line portion 310, FIG. 1. The process is continually repeated as the scanning device 102, FIG. 1 is moved relative to the surface 304.

Having summarily described the processing of the image data, the processing will now be described in greater detail. This process is further illustrated by the flow chart of FIG. 4. Processing the image data commences with the processor 350 sending an instruction to interface module one 370 instructing interface module one 370 to pass image data from segment number one 185 to the processor 350. The instruction is forwarded to segment number one 185 and image data is transmitted from segment number one 185 via data line one 355 to interface module one 370, where it passes to the processor 350 via interface line one 380. The processor 350 then sends an instruction to the interface module one 370 instructing image data to be sent from segment number eight 192. The image data is sent via data line eight 362 to interface module one 370 where it is transmitted via interface line one 380 to the processor 350. The processor 350 stores the image data generated by segment number one 185 and segment number eight 192 in separate groups for future processing. For example, the future processing may include linking the image data generated by segment number one 185 to the image data generated by segment number two 186. Ultimately the image data generated by all the photosensor segments 180 are linked. The linked image data is image data representative of the whole length of the scan line portion 310, FIG. 1, of the surface 304.

Similar instructions are sent to the remaining interface modules 378 to retrieve image data from the remaining photosensor segments 180. The image data generated by the photosensor segments 180, except for segment number two 186, segment number three 187, segment number twelve 196, and segment number thirteen 197 is output from the segments in the positive x-direction 247. Image data generated by segment number two 186, segment number three 187, segment number twelve 196, and segment number thirteen 197 is output from the segments in the negative x-direction 248. In other words, the order of the image data output from segment number two 186, segment number three 187, segment number twelve 196, and segment number thirteen 197 is reversed from the order of the image data output from the remaining segments. This reversal of the image data is due to these photosensor segments being oriented in an opposite direction relative to the other photosensor segments.

The image data output from each photosensor segment is stored in separate groups. In addition, the image data generated by each individual photodetector is stored in a specific location in its appropriate group. In order to account for the above-described reversed image data, the processor 350 electronically reverses the order of the image data stored in groups representing segment number two 186, segment number three 187, segment number twelve 196, and segment number thirteen 197. When the reversal is complete, the image data in all the groups is in the same order. The image data stored in all the groups may then be linked to form image data representative of the scan line portion 310, FIG. 1, For example, image data in the last location of one group may be linked to the first location in the adjacent group. The image data representative of the scan line portion 310, FIG. 1, may then be processed in a conventional manner. Referring to FIG. 1, as the scanning device 102 is moved relative to the surface 304, the above-described process is repeated to image a different scan line portion 310 of the surface 304.

During the imaging process, the first navigator 154 and the second navigator 156 generate image data representative of two area portions, not shown, of the surface 304, FIG. 1, of the sheet of paper 300. More specifically, the first navigator 154 and second navigator 156 generate image data representative of minute distinct features on the surface 304, FIG. 1. For example, the first navigator 154 and second navigator 156 may generate image data representative of irregularities in the surface 304, FIG. 1, caused by pulp material used to manufacture the sheet of paper 300. The processor 350, FIG. 3, receives the image data and determines the locations of these distinct features relative to the first navigator 154 and the second navigator 156. As the scanning device 102, FIG. 1, moves relative to the surface 304, the locations of these distinct features move relative to the first navigator 154 and the second navigator 156. The processor 350, FIG. 3, analyses this movement and correlates it to the movement of the scanning device 102 relative to the surface 304. Accordingly, the processor 350, FIG. 3, is readily able to determine the location of the optical assembly 100, FIG. 1, relative to the surface 304 during the imaging process. This location information is used to determine the locations of the scan line portions relative to each other in order to accurately replicate the image of the surface 304, FIG. 1. Examples of navigators used in conjunction with an optical scanning device to determine the position of the optical scanning device relative to a surface are further described in the following United States patents: U.S. Pat. No. 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

The baffles 271–277 reduce, or ideally eliminate, the amount of extraneous light that may intersect the first navigator 154, the second navigator 156, and the photodetecting portions 200 of the photosensor segments 180. Extraneous light is not representative of an image of the surface 304, FIG. 1, however, when it is imaged, it is processed into image data as though it is representative of an image of the surface 304. The influx of extraneous light ultimately results in the image data representing the surface 304 being inaccurate.

The first baffle 271, second baffle 272, third baffle 273, and fourth baffle 274 encircle the first navigator portion 150 and, thus, reduce extraneous light from interfering with the first navigator 154. Likewise, the first baffle 271, the fifth baffle 275, the sixth baffle 276, and the seventh baffle 277 reduce extraneous light that may interfere with the second navigator 156. It is to be understood that more baffles may be attached to the surface 120 of the printed circuit board 110 to reduce extraneous light from interfering with other components. For example, baffles may be placed between the photosensor segments 180 and the LEDs 250. The addition of baffles, however, increases the width 124 of the printed circuit board 110. As was described above, the baffles may be attached to the printed circuit board 110 or the housing 104, FIG. 1.

Having describe an embodiment of the optical assembly 100, other embodiments will now be described. Referring again to FIG. 2, the optical assembly 100 has been described herein as having fourteen photosensor segments 180 wherein four of the photosensor segments 180 are oriented in an opposite direction relative to the remaining photosensor segments 180. It is to be understood that the use of fourteen photosensor segments 180 is for illustration purposes only and that the optical assembly 100 may have as many photosensor segments 180 as are required for a particular application. It is also to be understood that other photosensor segments 180 than the four illustrated herein may be oriented opposite the remaining photosensor segments 180. For example, if additional space is required for electronic components on the surface 120 between the first navigator portion 150 and the 152, the orientation of photosensor segments between the segment number three 187 and the segment number twelve 196 may be reversed to accommodate these electronic components.

Referring to FIGS. 2 and 3, the orientation of the interface portions 202 relative to the printed circuit board 110 has been governed by the orientation of the photosensor segments 180. As described above, the image data is processed to account for the orientation of the photosensor segments 180. For example, image data output by segment number one 185 is in a reverse order relative to the image data generated by segment number two 186. Another embodiment of the optical assembly 100 overcomes the need to reverse the image data by using two different types of photosensor segments. A first type of photosensor segment has its interface portions facing a first direction and a second type of photosensor segment has its interface portion facing a second direction. The first direction is opposite the second direction. With regard to the example of FIG. 2, the segment number one 185 may be of the first type of photosensor segment and the segment number two 186 may be of the second type of photosensor segment. Accordingly, the image data generated by both segment number one 185 and segment number two 186 will be output in the same direction, e.g., the positive x-direction 247. In this embodiment, processing the image data to reverse the order of the image data generated by oppositely oriented photosensor segments is not required.

The photosensor segments 180 described above may be manufactured by providing photodetecting portions 200 having redundant connecting pads. For example, the conventional photodetecting portion 200 has a linear array of photodetectors attached thereto. The connecting pads are located on only one side of the linear array of photodetectors. The interface portion 202 electrically connects to the connecting pads, which establishes the orientation of the photosensor segment 180. The photodetecting portion may, however, be manufactured with identical connecting pads on both sides of the linear array of photodetectors. Thus, the interface portion 202 may be attached to either side of the linear array of photodetectors. This allows the photosensor segment 180 to be oriented in either direction by choosing which connecting pads the interface portion 202 is attached.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A method of manufacturing an electronic device comprising:

providing a substrate;

providing a plurality of optical components, each including a photodetecting portion and an interface portion electrically connected to said photodetecting portion;

mounting a first of said plurality of optical components to said substrate with said photodetecting portion thereof aligned along a first axis and said interface portion thereof offset from said first axis in a first direction;

mounting a second of said plurality of optical components to said substrate with said photodetecting portion thereof aligned along said first axis and said interface portion thereof offset from said first axis in a second direction which is different from said first direction.

2. The method of claim 1 wherein:

said mounting a first of said plurality of optical components further includes aligning said interface portion thereof along a second axis;

said mounting a second of said plurality of optical components further includes aligning said interface portion thereof along a third axis; and said second axis is substantially parallel to said third axis and said first axis.

3. The method of claim 1 and further comprising mounting a third of said plurality of optical components to said substrate adjacent said second of said plurality of optical components.

4. The method of claim 3 wherein:

said mounting a third of said plurality of optical components further comprises aligning said photodetecting portion thereof along said first axis and offsetting said interface portion thereof from said first axis in said first direction, thereby defining a space between said interface portions of said first and said third of said plurality of optical components.

5. The method of claim 4 and further comprising:

mounting at least one electronic component to said substrate at least partially within said space.

6. The method of claim 5 wherein said at least one electronic component is an illumination device.

7. The method of claim 5 wherein said at least one electronic component comprises a two-dimensional array of photodetectors.

8. The method of claim 1 wherein said first direction is opposite said second direction.

9. The method of claim 1 wherein said substrate is a printed circuit board.

10. An electronic device comprising:

a substrate;

at least one first linear optical component mounted to said substrate;

at least one second linear optical component mounted to said substrate;

wherein each of said at least one first and at least one second optical components includes:
  a photodetecting portion; and
  an interface portion electrically connected to said photodetecting portion;

wherein said photodetecting portion of said at least one first linear optical component is aligned along a first axis;

wherein said photodetecting portion of said at least one second linear optical component is aligned along said first axis;

wherein said interface portion of said at least one first linear optical component is offset from said first axis in first direction;

wherein said interface portion of said at least one second linear optical component is offset from said first axis in a second direction which is different from said first direction.

11. The device of claim 10 wherein:

said interface portion of said at least one first linear optical component is aligned along a second axis;

said interface portion of said at least one second linear optical component is aligned along a third axis; and said second axis is substantially parallel to said third axis and said first axis.

12. The device of claim 11 wherein:

said at least one second optical component comprises at least two second optical components having interface portions offset from said first axis in said second direction;

said at least one first optical component is located between said at least two second optical components; and a space is defined between said interface portions of said at least two second optical components.

13. The device of claim 12 and further comprising:

at least one first electronic component mounted to said substrate and at least partially located in said space.

14. The device of claim 13 wherein said at least one first electronic component is intersected by said third axis.

15. The device of claim 13 wherein said at least one first electronic component is an illumination device.

16. The device of claim 13 wherein said at least one first electronic component comprises a two-dimensional array of photodetectors.

17. The device of claim 10 wherein said at least one first optical component comprises a plurality of optical components.

18. The device of claim 10 wherein said first direction is opposite said second direction.

19. The device of claim 10 wherein said substrate is a printed circuit board.

20. The device of claim 10 wherein said electronic device is operatively associated with an optical scanning device.

21. An electronic device comprising:

a substrate;

a plurality of linear optical components mounted to said substrate, each of said plurality of linear optical components including a photodetecting portion and an interface portion electrically connected to said photodetecting portion;

wherein said photodetecting portion of each of said plurality of linear optical components is aligned along a first axis;

the interface portions of at least a first and a second of said plurality of linear optical components being offset from said first axis in a first direction and defining a first space therebetween;

the interface portions of at least a third and a fourth of said plurality of linear optical components being offset from said first axis in a second direction and defining a second space therebetween; and wherein said first direction is different from said second direction.

22. The device of claim 21 wherein:

said interface portions of said at least a first and a second of said plurality of linear optical components are aligned along a second axis;

said interface portions of said at least a third and a fourth of said plurality of linear optical components are aligned along a third axis; and said second axis is substantially parallel to said third axis and said first axis.

23. The device of claim 21 and further comprising:

at least one first electronic component mounted to said substrate and at least partially located in said first space.

24. The device of claim 23 wherein said at least one first electronic component is intersected by said second axis.

25. The device of claim 23 wherein said at least one first electronic component is an illumination device.

26. The device of claim 23 wherein said at least one first electronic component comprises a two-dimensional array of photodetectors.

27. The device of claim 21 and further comprising:

at least one second electronic component mounted to said substrate and at least partially located in said second space.

28. The device of claim 27 wherein said at least one second electronic component is intersected by said third axis.

29. The device of claim 27 wherein said at least one second electronic component is an illumination device.

30. The device of claim 27 wherein said at least one second electronic component comprises a two-dimensional array of photodetectors.

31. The device of claim 21 wherein said substrate is a printed circuit board.

32. The device of claim 21 wherein said electronic device is operatively associated with an optical scanning device.

* * * * *